US011418119B2

(12) United States Patent
Xie et al.

(10) Patent No.: US 11,418,119 B2
(45) Date of Patent: Aug. 16, 2022

(54) WIDE SWITCHING FREQUENCY RANGE SWITCHED MODE POWER SUPPLY CONTROL TOPOLOGY

(71) Applicant: TEXAS INSTRUMENTS INCORPORATED, Dallas, TX (US)

(72) Inventors: Jianzhang Xie, Shanghai (CN); Wei Zhao, Shanghai (CN); Yihan Yao, Shanghai (CN); Yue Wu, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 63 days.

(21) Appl. No.: 16/794,110

(22) Filed: Feb. 18, 2020

(65) Prior Publication Data

US 2020/0373841 A1 Nov. 26, 2020

Related U.S. Application Data

(60) Provisional application No. 62/850,775, filed on May 21, 2019.

(51) Int. Cl.
*H02M 3/158* (2006.01)
(52) U.S. Cl.
CPC ................................. *H02M 3/1582* (2013.01)
(58) Field of Classification Search
CPC .................................................. H02M 3/1582
See application file for complete search history.

(56) References Cited

U.S. PATENT DOCUMENTS

| 7,768,245 | B1* | 8/2010 | De Cremoux | H02M 3/156 |
| | | | | 323/225 |
| 9,698,674 | B1* | 7/2017 | Cherkassky | H02M 3/1582 |
| 10,116,216 | B2* | 10/2018 | Park | H02M 3/1582 |
| 10,594,218 | B1* | 3/2020 | Zhan | H02M 3/1582 |
| 2006/0176038 | A1* | 8/2006 | Flatness | H02M 3/156 |
| | | | | 323/282 |
| 2006/0284606 | A1* | 12/2006 | Chen | H02M 1/44 |
| | | | | 323/259 |
| 2009/0045786 | A1* | 2/2009 | Krellner | H02M 3/1582 |
| | | | | 323/259 |
| 2010/0019745 | A1* | 1/2010 | Keskar | H03K 17/16 |
| | | | | 323/271 |

(Continued)

*Primary Examiner* — Gustavo A Rosario-Benitez
(74) *Attorney, Agent, or Firm* — Charles A. Brill; Frank D. Cimino

(57) ABSTRACT

Aspects of the disclosure provide for a circuit. In some examples, the circuit includes a timing circuit and a state machine circuit. The timing circuit determines a relationship between a duty cycle of a power converter and a threshold value. The state machine circuit is coupled to the timing circuit and includes a plurality of states including a buck state, a boost state, and a buck-boost state. The state machine circuit transitions among the plurality of states according to time domain control and voltage domain control, based at least partially on the determined relationship between the duty cycle and the threshold value, transitions among the states according to the time domain control when the time domain control indicates an exit from the buck-boost state, and transitions among the states according to the voltage domain control when the voltage domain control indicates the exit from a buck-boost state.

28 Claims, 10 Drawing Sheets

(56) References Cited

U.S. PATENT DOCUMENTS

| | | | |
|---|---|---|---|
| 2011/0187339 A1* | 8/2011 | Trattler | H05B 45/3725 |
| | | | 323/283 |
| 2011/0241636 A1* | 10/2011 | Wu | H02M 3/1588 |
| | | | 323/272 |
| 2012/0262142 A1* | 10/2012 | Chen | H02M 3/1582 |
| | | | 323/284 |
| 2014/0097810 A1* | 4/2014 | Parthasarathy | H02M 3/1563 |
| | | | 323/234 |
| 2014/0152272 A1* | 6/2014 | Bazzani | H02M 3/1582 |
| | | | 323/234 |
| 2014/0239720 A1* | 8/2014 | Liu | H02M 3/1582 |
| | | | 307/31 |
| 2015/0162835 A1* | 6/2015 | Hang | H02M 3/1582 |
| | | | 323/271 |
| 2015/0229215 A1* | 8/2015 | Choudhary | H02M 1/14 |
| | | | 323/271 |
| 2017/0155324 A1* | 6/2017 | Choquet | H02M 3/1582 |
| 2017/0207703 A1* | 7/2017 | Houston | H02M 3/1582 |
| 2018/0166990 A1* | 6/2018 | Gibson | H02M 3/158 |
| 2019/0305666 A1* | 10/2019 | Yang | H02M 3/1582 |
| 2020/0366204 A1* | 11/2020 | Shen | H02M 3/1582 |

\* cited by examiner

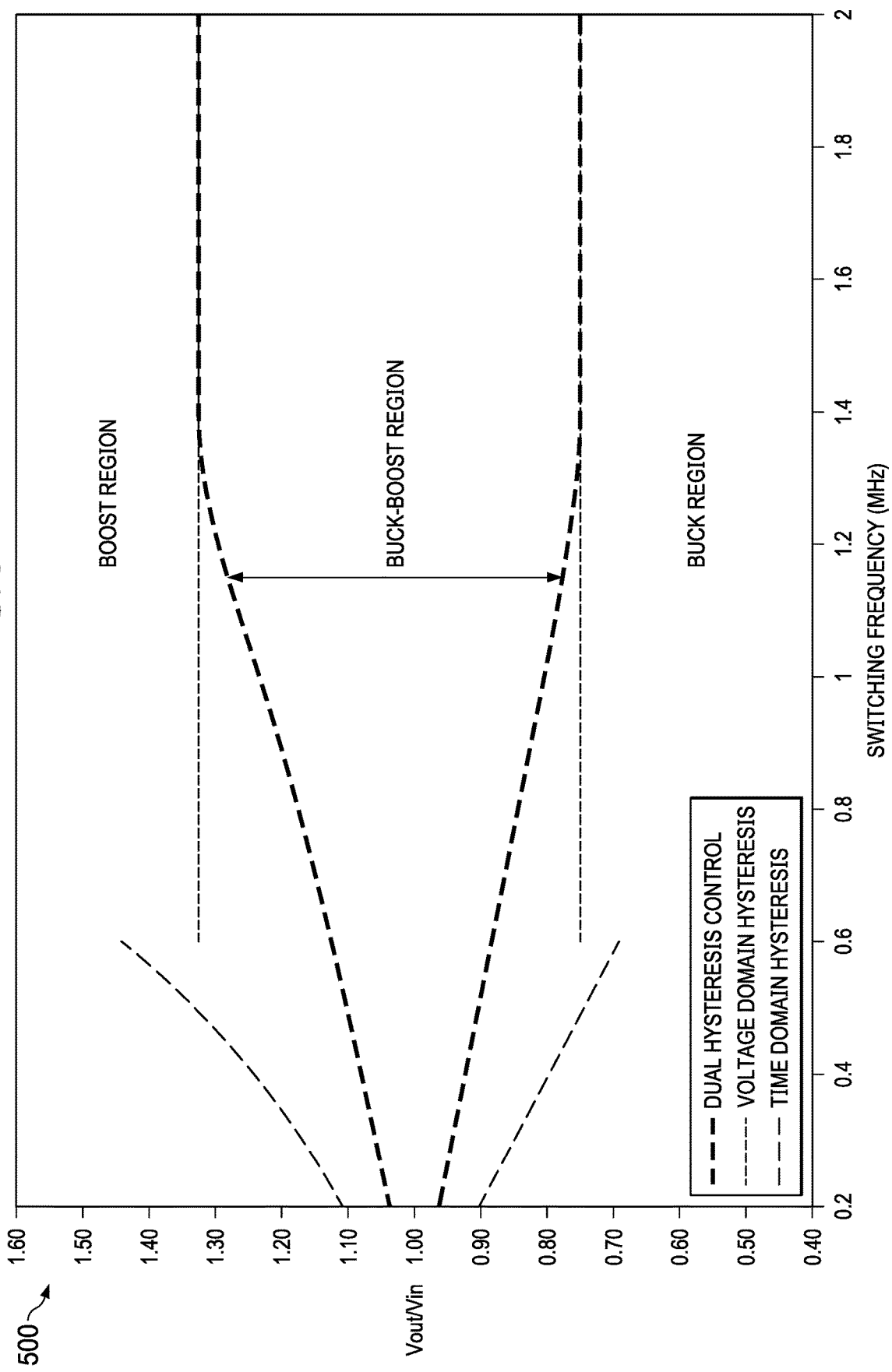

WIDE SWITCHING FREQUENCY RANGE SWITCHED MODE POWER SUPPLY CONTROL TOPOLOGY

CROSS-REFERENCE TO RELATED APPLICATIONS

The present application claims priority to U.S. Provisional Patent Application No. 62/850,775, which was filed May 21, 2019, is titled "Buck-Boost DC-DC Converter with Wide Switching Frequency Range," and is hereby incorporated herein by reference in its entirety.

BACKGROUND

A switched mode power supply (SMPS) transfers power from an input power source to a load by switching one or more power transistors coupled through a switch node/terminal to an energy storage element (such as an inductor/transformer and/or capacitor), which is capable of coupling to the load. The power transistors can be included in a power converter that includes, or is capable of coupling to, the energy storage element. An SMPS can include an SMPS controller to provide one or more gate drive signals to the power transistor(s). Varying switching frequencies are applicable to certain application environments for the SMPS, but optimizing an SMPS controller for a wide range of switching frequencies can bring challenges.

SUMMARY

Aspects of the disclosure provide for a circuit. In at least some examples, the circuit includes a timing circuit and a state machine circuit. The timing circuit is configured to determine a relationship between a duty cycle of a power converter and a threshold value. The state machine circuit is coupled to the timing circuit and includes a plurality of states including a buck state, a boost state, and a buck-boost state. The state machine circuit is configured to transition among the plurality of states according to time domain control and voltage domain control, based at least partially on the determined relationship between the duty cycle of the power converter and the threshold value, transition among the plurality of states according to the time domain control when the time domain control indicates an exit from the buck-boost state, and transition among the plurality of states according to the voltage domain control when the voltage domain control indicates the exit from a buck-boost state.

Other aspects of the disclosure provide for a circuit. In at least some examples, the circuit includes a timing circuit and a state machine circuit. The timing circuit is configured to determine a relationship between a duty cycle of a power converter and a threshold value. The state machine circuit is coupled to the timing circuit and comprising a plurality of states including a buck-boost state and at least another state. The state machine circuit is configured to transition from the another state to the buck-boost state, based at least partially on the determined relationship between the duty cycle of the power converter and the threshold value, when both time domain control and voltage domain control indicate an entry to the buck-boost state. The state machine circuit is further configured to transition from the buck-boost state to the another state, based at least partially on the determined relationship between the duty cycle of the power converter and the threshold value, when the time domain control or the voltage domain control indicates an exit from the buck-boost state.

Other aspects of the disclosure provide for a system. In at least some examples, the system includes a load, a power converter, and a controller. The power converter is coupled to the load and configured to provide the load with an output voltage (VOUT) switched from an input voltage (VIN) by the power converter. The controller is coupled to the power converter and configured to control the power converter to switch VIN to VOUT. The controller switches VIN to VOUT by generating a plurality of clock signals, determining a relationship between a duty cycle of the power converter and a threshold value determined according to at least some of the plurality of clock signals, and controlling the power converter to operate in a buck-boost mode of operation based at least partially on the determined relationship between the duty cycle of the power converter and the threshold value when both time domain control and voltage domain control specify operation of the power converter in the buck-boost mode of operation.

BRIEF DESCRIPTION OF THE DRAWINGS

For a detailed description of various examples, reference will now be made to the accompanying drawings in which:

FIG. 5 shows an illustrative graph of buck-boost region width versus switching frequency in accordance with various examples;

DETAILED DESCRIPTION

Figure 1:
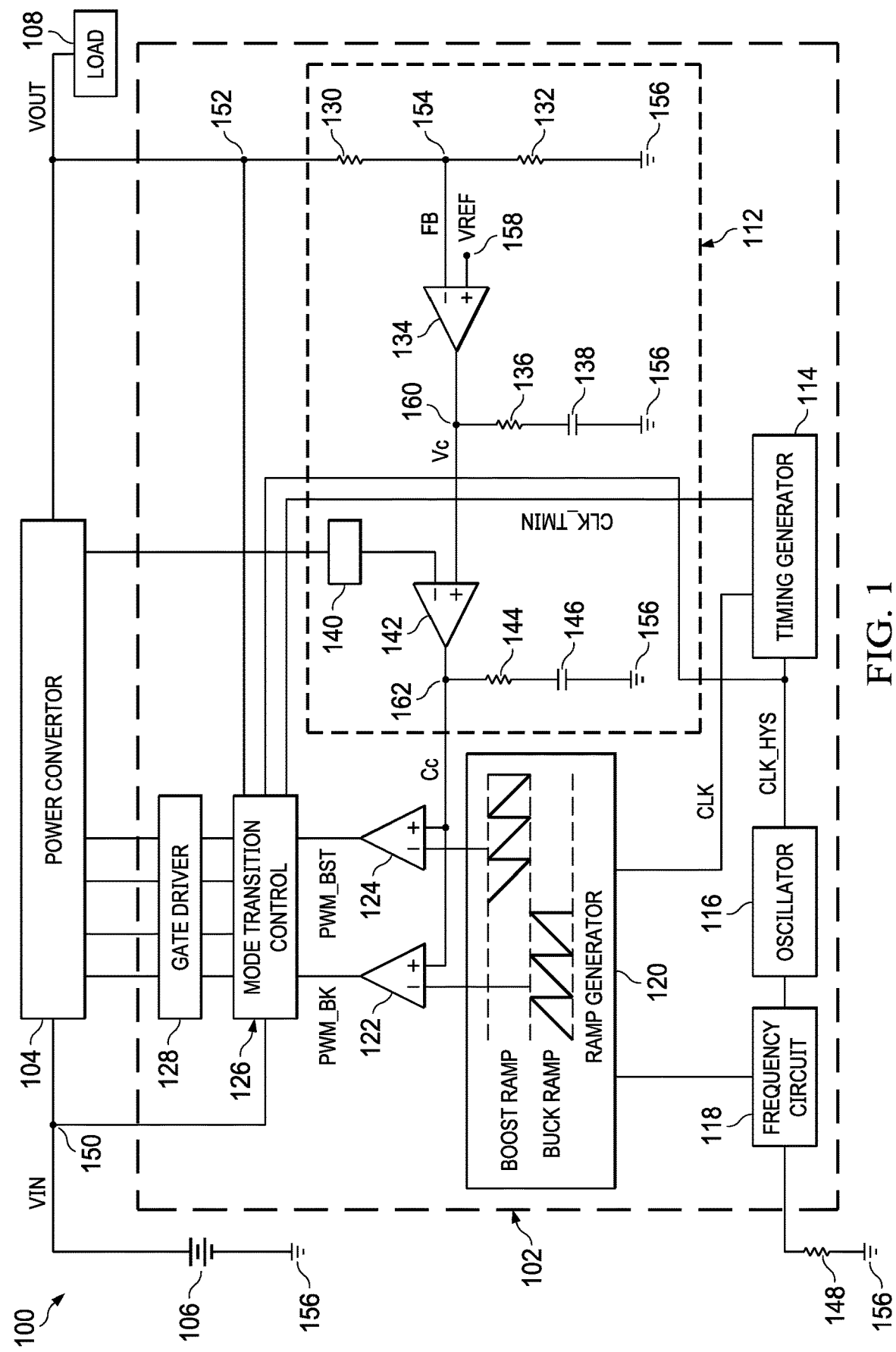
FIG. 1 shows a block diagram of an illustrative SMPS in accordance with various examples.

In some architectures (such as buck-boost), a switched mode power supply (SMPS) includes, or is capable of coupling to, an output/bulk capacitor in parallel with the load. A SMPS controller switches the power transistor(s) to form circuit arrangements with energy storage element(s) to supply a load current to the load and/or to the output/bulk capacitor to maintain a regulated output voltage (e.g., by filtering the switched load current). For example, a power transistor can be coupled through the switch node/terminal to an energy storage inductor. The energy storage inductor is switched by the SMPS controller between charge and discharge cycles to supply inductor current (e.g., current through the energy storage inductor) to the load and to the output/bulk capacitor to filter the inductor current to maintain the regulated output voltage. In some examples, an SMPS can be configured for operation as a constant current source with an energy storage element but with no output/bulk capacitor.

The power transistors can be implemented as metal oxide semiconductor field effect transistors (MOSFETs) or any other suitable solid-state transistor devices (e.g., such as bi-polar junction transistors (BJTs)). As an input voltage (VIN), or an output voltage (VOUT), of the power converter varies, the SMPS controller may control the power converter to operate in different modes of operation. For example, when VIN is greater than VOUT, the SMPS controller may control the power converter to operate in a buck mode of operation. When VIN is less than VOUT, the SMPS controller may control the power converter to operate in a boost mode of operation. When VIN is approximately equal to VOUT, the SMPS controller may control the power converter to operate in a buck-boost mode of operation. In at least some examples, minimizing an amount of time that the power converter operates in the buck-boost mode of operation may be advantageous. For example, when operating in the buck-boost mode of operation, output ripple of the power converter as present in VOUT or an inductor current of the power converter, is greater than when operating in the buck or boost mode of operation. In at least some implementations, the ripple in the buck-boost mode of operation is approximately double the ripple during the buck or boost mode of operation. For at least some buck-boost power converter implementations it is advantageous to minimize ripple, for example, to reduce a need for, or strength of, filtering of VOUT generated and output by the buck-boost power converter.

To control a mode of operation of the power converter, the SMPS controller provides gate control signals to one or more power transistors of the power converter. A value of each of these gate control signals determines whether a respective power transistor receiving the gate control signal is in a conductive state (e.g., turned on) or in a non-conductive state (e.g., turned off). To change a mode of operation of the power converter, the SMPS controller modifies a value of one or more of the gate control signals to turn one or more of the power transistors on or off. Additionally, while remaining in a mode of operation of the power converter, the SMPS controller may modify a value of one or more of the gate control signals, for example, to alternatively turn on and turn off one or more power transistors.

Generally, the SMPS controller controls the power converter to operate at a particular frequency. Some frequencies, such as high frequencies (e.g., greater than about 1.8 megahertz (MHz)), enable a smaller physical footprint of the power converter and/or SMPS controller by enabling the use of smaller circuit components. Other frequencies, such as low frequencies (e.g., less than about 500 kilohertz (kHz)), enable increased efficiency of a power converter by reducing switching losses of the power converter. Often, the SMPS controller implements a fixed-frequency control scheme that is optimized for either high frequency operation or low frequency operation. However, an SMPS controller optimized for operation across a wide frequency range may be advantageous in providing increased flexibility in implementing the SMPS controller.

At least some aspects of the present disclosure relate to a controller suitable for controlling a power converter, such as in a SMPS. In at least one example, the controller includes elements suitable for implementing a dual hysteresis control scheme. The dual hysteresis control scheme, in at least some examples, is dominated by one type of control when the power converter is operating at low frequencies (e.g., less than about 1.2 MHz, less than about 500 kHz, etc.) and is dominated by another type of control when the power converter is operating at high frequencies (e.g., greater than about 1.2 MHz, greater than about 1.8 MHz, etc.). For example, the dual hysteresis control scheme is dominated by time domain hysteresis control when the power converter is operating at low frequencies and is dominated by voltage domain hysteresis control when the power converter is operating at high frequencies.

The controller controls the power converter to operate in a mode of operation according to the dual hysteresis control scheme. For example, the controller controls the power converter to operate in a mode of operation based on a minimum of buck-boost regions determined by the time domain hysteresis control and the voltage domain hysteresis control. For example, if the buck-boost region of operation is defined according to a ratio of VOUT to VIN, a value of the buck-boost region under control of the dual hysteresis control scheme is minimized when compared to a value of the buck-boost region under individual control of the time domain hysteresis control or the voltage domain hysteresis control. In at least some examples, implementing the dual hysteresis control of the present disclosure provides a minimized duration of operation in the buck-boost mode and a minimum achievable inductor current ripple in buck-boost mode over a wide range of switching frequencies (e.g., such as about 200 kHz to about 2 MHz). For example, for a power converter inductor having an inductance of about 4 microhenries (uH) operating at a switching frequency of about 400 kHZ and VOUT of about 10 volts (V), the dual hysteresis control of the present disclosure limits inductor current ripple to about 1.5 amps (A) while the power converter is in the buck-boost mode of operation.

Turning now to FIG. 1, a block diagram of an illustrative SMPS 100 is shown. In at least one example, the SMPS 100 includes a controller 102 and a power converter 104. The SMPS 100, at least through the power converter 104, switches power from a node 150, provided by a power source 106, to a load 108. The power converter 104 is, for example, a buck-boost power converter that is capable of operating according to a buck mode of operation, a boost mode of operation, and a buck-boost mode of operation. In at least one example, the controller 102 includes, or is configured to couple to, a feedback circuit 112, a timing generator 114, an oscillator 116, a frequency circuit 118, a ramp generator 120, a comparator 122, a comparator 124, mode transition control circuit 126, and a gate driver 128. For the sake of description, the SMPS 100 is illustrated and described as implementing average current mode control over the power converter 104. However, the dual hysteresis control scheme of the present disclosure is equally applicable to other control methods, such as peak current mode control, voltage mode control, or any other suitable form of control implemented in a fixed frequency system.

At least one example of the SMPS 100 includes at least some aspects of the controller 102 and the power converter 104 on a same semiconductor die and/or in a same component package, while in other examples the controller 102 and the power converter 104 may be fabricated separately and configured to couple together. For example, at least some aspects of the controller 102 may be fabricated separately and coupled together. Accordingly, while illustrated as including the gate driver 128, in at least one example the controller 102 does not include the gate driver 128 and instead is configured to couple to the gate driver 128. Similarly, other components illustrated as being included in the controller 102 may instead be configured to couple, in whole or in part, to the controller 102 and not be included on a same semiconductor die and/or in a same component package as the controller 102.

In at least one example, the feedback circuit 112 includes a resistor 130 coupled between a node 152 and a node 154 and a resistor 132 coupled between the node 154 and a ground node 156. The feedback circuit 112 further includes an amplifier 134 having a first input terminal (e.g., a non-inverting input terminal) coupled to a node 158 and configured to receive a reference voltage (VREF) at the node 158. The amplifier 134 further has a second input terminal (e.g., an inverting input terminal) coupled to the node 154, and an output terminal coupled to a node 160. A feedback signal (FB) is present at the node 154 and is a scaled representation of VOUT, scaled according to a ratio of resistance of the resistor 132 to resistance of the resistor 130. A signal (VC) is present at the node 160, output by the amplifier 134 based on a difference between VREF and FB. A resistor 136 is coupled between the node 160 and a top plate of a capacitor 138 and a bottom plate of the capacitor 138 is coupled to the ground node 156. The feedback circuit 112 further includes a current sense circuit 140 and an amplifier 142. The current sense circuit 140 is configured to couple to the power converter 104 to generate an output signal (VI) that is a voltage representation of a current flowing through the power converter 104. The amplifier 142 has a first input terminal (e.g., a positive or non-inverting input terminal) coupled to the node 160, a second input terminal (e.g., a negative or inverting input terminal) coupled to an output terminal of the current sense circuit 140, and an output terminal coupled to a node 162. A current control signal (CC) is present at the node 162, output by the amplifier 142 based on a difference between VC and VI. A resistor 144 is coupled between the node 162 and a top plate of a capacitor 146 and a bottom plate of the capacitor 146 is coupled to the ground node 156.

The timing generator 114, in at least some examples, has a first output terminal coupled to the oscillator 116 and the mode transition control circuit 126, a second output terminal coupled to the ramp generator 120, and a third output terminal coupled to the mode transition control circuit 126. In at least some examples, the timing generator 114 includes any one or more components suitable for generating additional clock signals based on a received clock signal. For example, the timing generator 114 includes one or more delay cells (not shown) configured to implement a fixed or variable delay in a received clock signal to generate an additional clock signal. In at least one example, the timing generator 114 receives CLK_HYS from the oscillator 116, generates and outputs CLK to the ramp generator 120, and generates and outputs CLK_TMIN to the mode transition control circuit 126.

The oscillator 116, in at least some examples, is any component suitable for generating a clock signal, illustrated in FIG. 1 as CLK_HYS. A frequency of CLK_HYS is determined, in at least some examples, based on a value of a signal received from the frequency circuit 118. For example, the frequency circuit 118 generates a current signal ICLK based at least partially on a value of a resistor 148 coupled to the frequency circuit 118. The frequency circuit 118 outputs ICLK to the oscillator 116 to enable the oscillator 116 to generate CLK_HYS at least partially according to ICLK. In at least some examples, the frequency circuit 118 further outputs ICLK to the ramp generator 120.

The ramp generator 120, in at least some examples, is any component or components suitable for generating buck and boost ramp signals for use in controlling the power converter 104. In at least some examples, the buck and boost ramp signals are generated by charging and resetting (e.g., discharging) one or more capacitors (not shown) at a specified rate of charge, specified by a current value of a signal charging the one or more capacitors. In at least some examples, based on the received CLK and ICLK signals, the ramp generator 120 generates and outputs the buck ramp signal and the boost ramp signal.

The comparator 122 includes a first input terminal (e.g., a positive or non-inverting input terminal) coupled to the node 162, a second input terminal (e.g., a negative or inverting input terminal) coupled to the ramp generator 120 and configured to receive the buck ramp signal from the ramp generator 120, and an output terminal. The comparator 124 includes a first input terminal (e.g., a positive or non-inverting input terminal) coupled to the node 162, a second input terminal (e.g., a negative or inverting input terminal) coupled to the ramp generator 120 and configured to receive the boost ramp signal from the ramp generator 120, and an output terminal. In at least some examples, a control signal PWM_BK is present at the output terminal of the comparator 122 and a control signal PWM_BST is present at the output terminal of the comparator 124. In some examples, PWM_BK has an asserted value when CC is greater in value than the buck ramp and a de-asserted value when CC is less in value than the buck ramp. Similarly, in some examples PWM_BST has an asserted value when CC is greater in value than the boost ramp and a de-asserted value when CC is less in value than the boost ramp.

The mode transition control circuit 126 has a plurality of input terminals configured to receive at least CLK_TMIN, CLK_HYS, PWM_BK, PWM_BST, VOUT, and VIN (collectively referred to with respect to the mode transition control circuit 126 as the received signals). In at least some examples, the mode transition control circuit 126 includes or implements a state machine to generate one or more control signals for controlling the power converter 104 according to the received signals. Operation of the mode transition control circuit 126 is discussed in greater detail below.

In at least one example, the SMPS 100 is configured to receive VIN from the power source 106 at the node 150 and provide VOUT at the node 152 for supplying the load 108. VOUT is based at least partially on VIN and VREF as received by the SMPS 100 at the node 158. VREF may be received from any suitable device (not shown) such as a processor, microcontroller, or any other device exerting control over the SMPS 100 to control a value of VOUT. In at least one example, VREF has a value representative of a desired (e.g., user-desired, target, preconfigured, programmed, etc.) value of FB. Accordingly, in at least some implementations, the controller 102 receives one or more signals from the power converter 104. For example, the controller 102 may receive VOUT from the power converter 104 and/or an inductor current (IL) of the power converter 104. In various examples, IL may be a value directly measured from an inductor (not shown) of the power converter 104 (or a terminal of another component of the power converter 104 to which the inductor is also coupled) or a value sensed from a sense element (not shown) of the power converter 104. The sense element is, for example, a sense resistor, a transistor, or any other component or combination of components capable of measuring IL of the power converter 104 and providing the value representative of IL to the controller 102. In at least one example, the value representative of IL is provided to the feedback circuit 112 for generation of VI and VOUT is provided to the feedback circuit 112 and the mode transition control circuit 126.

In at least one example, the feedback circuit 112 is configured to receive VREF and VOUT and generate VC indicating a variation in VREF from VFB. VC is referred to in some examples as an error signal. In at least some examples, FB is an output of a voltage divider formed of the resistor 130 and the resistor 132, where an input to the voltage divider is VOUT. VC is subsequently filtered by the resistor 136 and the capacitor 138 before being received by the amplifier 142. The amplifier 142, in at least one example, is configured to receive VC and VI and generate CC indicating a variation in VC from VI. CC is subsequently filtered by the resistor 144 and the capacitor 146 before being received by the comparator 122 and the comparator 124.

As discussed above, in at least one example the frequency circuit 118 generates and outputs a signal ICLK based on a resistance of the resistor 148. ICLK at least partially determines a frequency of a clock signal CLK_HYS generated and output by the oscillator 116. The timing generator 114 receives CLK_HYS and generates one or more additional clock signals (illustrated in FIG. 1 as CLK and CLK_TMIN) by manipulating CLK_HYS. For example, in at least one implementation, the timing generator 114 modifies CLK_HYS to generate CLK and CLK_TMIN by delaying CLK_HYS for one or more predetermined periods of time. In at least one example, the timing generator 114 generates CLK by delaying CLK_HYS according to a delay $t_{hys}$ (e.g., such that CLK=CLK_HYS+$t_{hys}$) and generates CLK_TMIN according to a delay of $t_{hys}$ minus $t_{min}$ (e.g., such that CLK_TMIN=CLK_HYS+$t_{hys}$-$t_{min}$). The delay $t_{hys}$, in at least some examples, is approximately equal to a hysteresis time for an on time (Ton_hys) of the power converter 104 when operating in the boost mode of operation and a hysteresis time for an off time (Toff_hys) of the power converter 104 when operating in the buck mode of operation. Further, the delay $t_{min}$, in at least some examples, is approximately equal to a minimum on time (Ton_min) of the power converter 104 when operating in the boost mode of operation and an off time (Toff_min) of the power converter 104 when operating in the buck mode of operation. In at least one example, the timing generator 114 generates CLK and CLK_TMIN by implementing one or more delay cells of any suitable architecture. However, in at least one example, a series of digital circuit components implement the delay. For example, the delay is implemented by one or more d-flip flops, one or more digital inverter circuits, or any other circuit components suitable for implementing a delay, the scope of which is not limited herein.

The mode transition control circuit 126 receives CLK_TMIN, CLK_HYS, PWM_BK, PWM_BST, VOUT, and VIN and generates control signals for controlling the gate driver 128 to control the power converter 104. In at least one example, the mode transition control circuit 126 includes or otherwise implements a digital state machine to generate the control signals based on values of CLK_TMIN, CLK_HYS, PWM_BK, PWM_BST, VOUT, and/or VIN. To generate the control signals, in at least some examples, the mode transition control circuit 126 implements the dual hysteresis control scheme. In the dual hysteresis control scheme, at low frequencies of CLK_HYS the mode transition control circuit 126 generates the control signals according to time domain hysteresis control and generates the control signals according to voltage domain hysteresis control at high frequencies of CLK_HYS. Operation of the mode transition control circuit 126 will be discussed in greater detail below.

Based on the control signals received from the mode transition control circuit 126, the gate driver 128 generates gate control signals for controlling power transistors of the power converter 104, as discussed above. For example, the gate driver 128 generates gate control signals that alternatingly, and selectively, turn the power transistors of the power converter on and off to energize and de-energize elements such as an inductor and/or a capacitor (each not shown). This energizing and de-energizing provides the buck, boost, and/or buck-boost functionality discussed herein. The gate driver 128 is implemented according to any suitable architecture, the scope of which is not limited herein.

Figure 2:
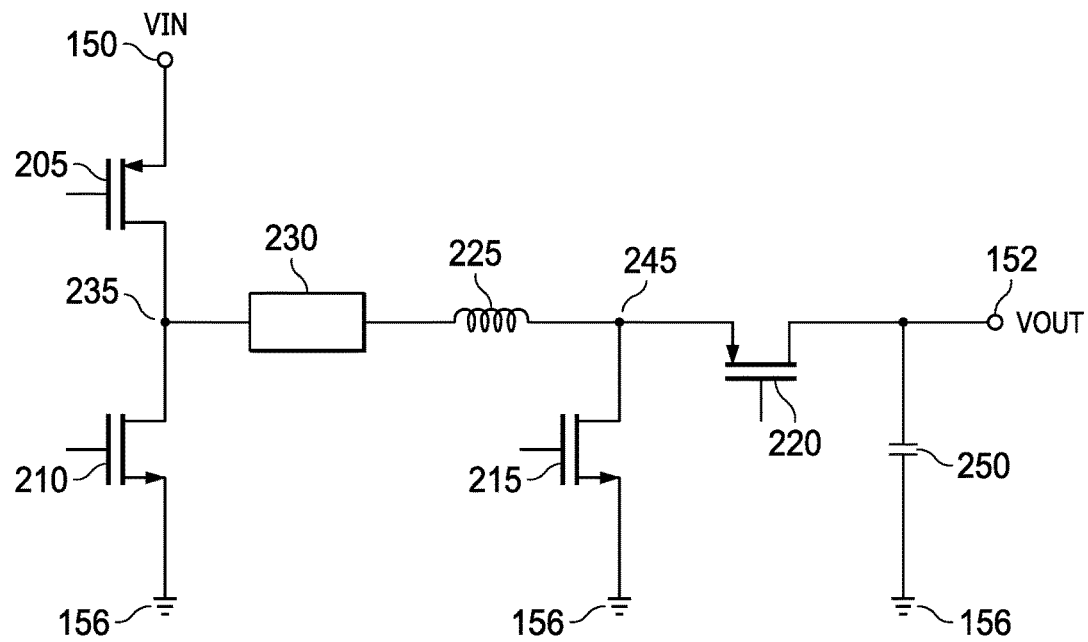
FIG. 2 shows a schematic diagram of an illustrative buck-boost power converter in accordance with various examples.

Turning now to FIG. 2, a schematic diagram of an illustrative buck-boost power converter 200 is shown. In at least one example, the buck-boost power converter 200 is suitable for implementation as the power converter 104 of the SMPS 100 of FIG. 1, discussed above. Accordingly, reference is made to at least some components or signals of FIG. 1 in describing FIG. 2.

In one example, the buck-boost power converter 200 includes a plurality of metal oxide semiconductor field effect transistors (MOSFETs) 205, 210, 215, and 220, and at least one energy storage device (illustrated in this example as an inductor 225). In another example, the buck-boost power converter 200 further includes a second inductor (not shown) and/or a fly-capacitor (not shown). In one example, the MOSFETs 205 and 220 are implemented as p-type MOSFETs (PMOS) and the MOSFETs 210 and 215 are implemented as n-type MOSFETs (NMOS). In at least one example, the buck-boost power converter 200 further includes a sense element 230 suitable for sensing IL of the inductor 225 and generating the signal representative of IL. The sense element 230 is, for example, a MOSFET, a resistor, or any other suitable circuit capable of, or having a means of, sensing, measuring, or detecting IL. In at least one example, the sense element 230 is implemented by one of the MOSFETs 205, 210, 215, or 220 such that the sense element 230 is not an independent, additional component of the buck-boost power converter 200. Further, in at least some examples, the sense element 230 also functions as, or as a component of, the current sense circuit 140.

In one example architecture, a source terminal of the MOSFET 205 is coupled to the node 150 and configured to receive VIN, a drain terminal of the MOSFET 205 is coupled to a node 235, and a gate terminal of the MOSFET 205 is coupled to a controller. The controller is, for example, the gate driver 128. A drain terminal of the MOSFET 210 is coupled to the node 235, a source terminal of the MOSFET 210 is coupled to the ground node 156, and a gate terminal of the MOSFET 210 is coupled to the controller. A first terminal of the inductor 225 is coupled to the node 235 and a second terminal of the inductor 225 is coupled to a node 245. In at least one example, the sense element 230 is coupled in series between node 235 and the first terminal of the inductor 225. A drain terminal of the MOSFET 215 is coupled to the node 245, a source terminal of the MOSFET 215 is coupled to the ground node 156, and a gate terminal of the MOSFET 215 is coupled to the controller. A source terminal of the MOSFET 220 is coupled to the node 245, a drain terminal of the MOSFET 220 is coupled to the node 152 at which VOUT is present, and a gate terminal of the MOSFET 220 is coupled to the controller. In at least one example, the inductor 225 is implemented as an external component such that the buck-boost power converter 200 does not include the inductor 225 but is configured to couple to the inductor 225 between the node 235 and the node 245. In at least one example, the buck-boost power converter 200 is configured to couple to a capacitor 250 (e.g., such as a filtering capacitor) between the drain terminal of the MOSFET 220 and the ground node 156.

In one example, the MOSFETs 205, 210, 215, and/or 220 are controlled to turn on (e.g., conduct current between their respective drain terminals and source terminals) and/or turn off (e.g., cease conducting current between their respective drain terminals and source terminals) based on a signal received at their respective gate terminals. For example, based on a gate control signal received from the controller (e.g., as output by the gate driver 128 under control of the mode transition control circuit 126), one or more of the MOSFETs 205, 210, 215, and/or 220 are controlled to turn on or turn off. The MOSFETs 205, 210, 215, and/or 220 may turn on (or off) based on a value, or relationship between values, present at one or more of their respective gate terminals and/or source terminals. Based on which of the MOSFETs 205, 210, 215, or 220 are turned on at a given time, which of the MOSFETs 205, 210, 215, or 220 are turned off at a given time, and a sequence of turning on and/or off the MOSFETs 205, 210, 215, and/or 220, the buck-boost power converter 200 operates in a buck mode of operation, a boost mode of operation, or a buck-boost mode of operation.

Figure 3:
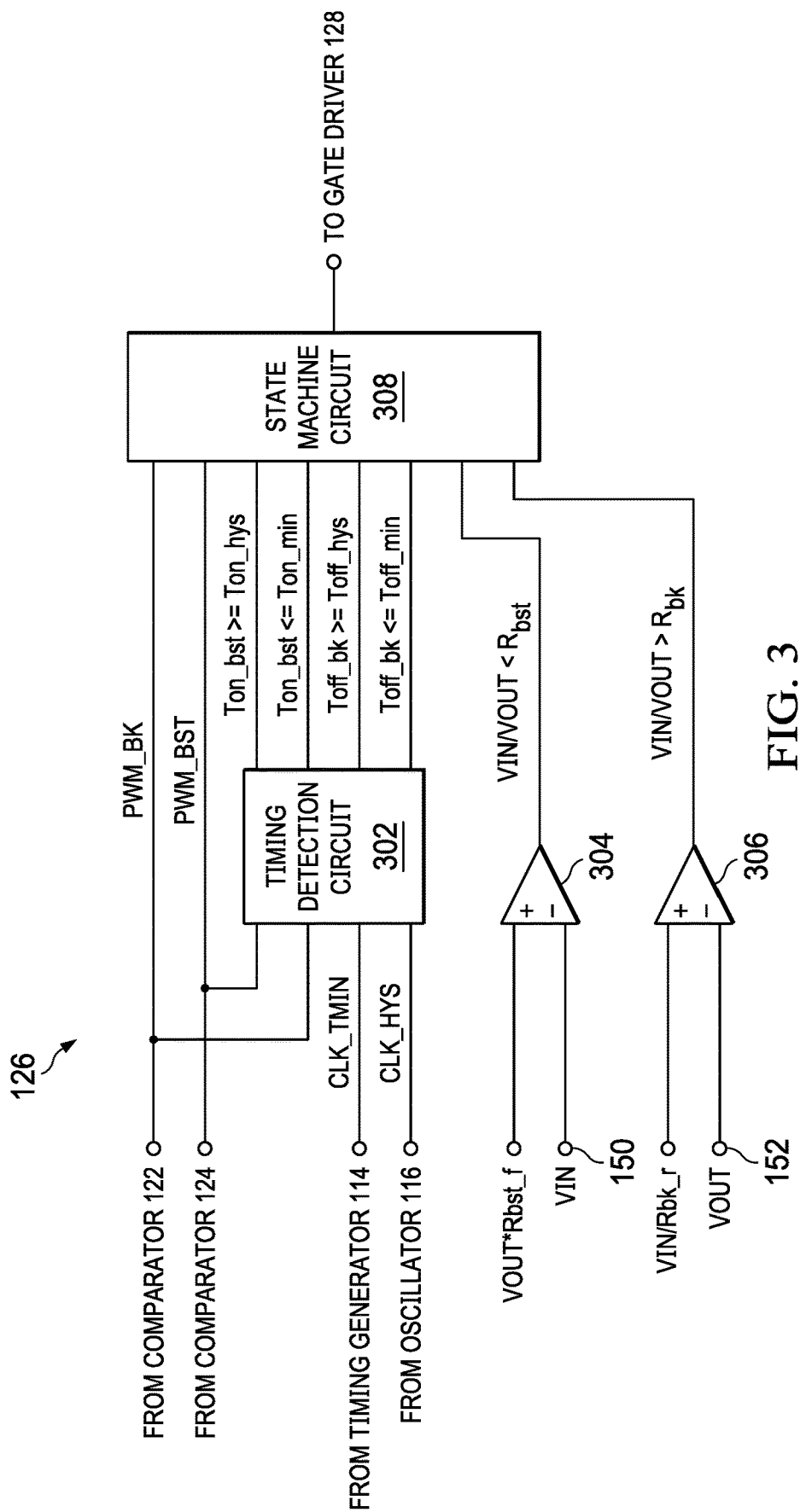
FIG. 3 shows a schematic diagram of an illustrative mode transition control circuit in accordance with various examples.

Turning now to FIG. 3, a schematic diagram of an illustrative implementation of the mode transition control circuit 126 is shown. Accordingly, the mode transition control circuit 126 as shown in FIG. 3 is suitable for implementation in at least some examples of the controller 102 of the SMPS 100 of FIG. 1. Therefore, reference may be made in describing FIG. 3 to at least some components and/or signals introduced and/or described above with respect to FIG. 1.

In at least one example, the mode transition control circuit 126 includes a timing detection circuit 302, a comparator 304, a comparator 306, and a state machine circuit 308. The timing detection circuit 302 is configured to receive PWM_BK, PWM_BST, CLK_HYS, and CLK_TMIN. Based on at least some of PWM_BK, PWM_BST, CLK_HYS, and/or CLK_TMIN, the timing detection circuit 302 makes a plurality of timing determinations and outputs a plurality of signals to the state machine circuit 308 indicating a result of a respective one of the timing determinations. For example, the timing detection circuit 302 performs one or more calculations to determine whether an on time of the boost mode of operation (Ton_bst) of the power converter 104 is greater than or equal to Ton_hys, and whether Ton_bst is less than or equal to Ton_min. The timing detection circuit 302 further performs one or more calculations to determine whether an off time of the buck mode of operation (Toff_bk) is greater than or equal to Toff_hys, and whether Toff_bk is less than or equal to Toff_min. In at least some examples, one or more signals indicating results of these determinations are output by the timing detection circuit 302 to the state machine circuit 308. In at least some examples, Ton_hys and Toff_hys are determined, respectively, according to the following equations (1) and (2) in which $t_{min}$ is the minimum turn on/off time that power converter 104 and gate driver 128 can achieve and $\Delta$ is a hysteresis factor to prevent control of the power converter 104 from oscillating between modes of operation.

$$Ton\_hys = 3t_{min} + \Delta \qquad (1)$$

$$Toff\_hys = 3t_{min} + \Delta \qquad (2)$$

In at least some examples, a minimum VIN to VOUT ratio that the power converter 104 can regulate while in the buck mode of operation is defined as $R_{bk}$. In at least one implementation of the SMPS 100, $R_{bk}$ is determined according to the following equation (3) in which k is a hysteresis factor to prevent control of the power converter 104 from oscillating between modes of operation and $T_{min}$ is a switch period of the power converter 104 when operating at its highest supported switching frequency.

$$R_{bk} = (1 + k1)\left(1 + \frac{\text{Toff\_min}}{T_{min} - \text{Toff\_min}}\right) \qquad (3)$$

In at least some examples, a maximum VIN to VOUT ratio that the power converter 104 can regulate while in the boost mode of operation is defined as $R_{bst}$. In at least one implementation of the SMPS 100, $R_{bst}$ is determined according to the following equation (4) in which k2 is a hysteresis factor to prevent control of the power converter 104 from oscillating between modes of operation.

$$R_{bst} = (1 - k2)\left(1 - \frac{\text{Ton\_min}}{T_{min}}\right) \qquad (4)$$

The comparator 304 is configured to receive a value approximately equal to VOUT*$R_{bst}$ at a first input terminal (e.g., a positive or non-inverting input terminal) and receive VIN at a second input terminal (e.g., a negative or inverting input terminal). While not shown in FIG. 3, in at least some examples the signal VOUT*$R_{bst}$ is generated by a voltage divider that receives VOUT. In other examples, VOUT*$R_{bst}$ is formed in any suitable manner and by any suitable components. An output terminal of the comparator 304 is coupled to an input terminal of the state machine circuit 308. A signal output by the comparator 304 is asserted, in at least some examples, when VIN/VOUT is less than $R_{bst}$ and is de-asserted when VIN/VOUT is greater than $R_{bst}$. The comparator 306 is configured to receive a value approximately equal to VIN/$R_{bk}$ at a first input terminal (e.g., a positive or non-inverting input terminal) and receive VOUT at a second input terminal (e.g., a negative or inverting input terminal). While not shown in FIG. 3, in at least some examples, the signal VIN/$R_{bk}$ is generated by a voltage divider that receives VOUT. In other examples, VIN/$R_{bk}$ is formed in any suitable manner and by any suitable components. An output terminal of the comparator 306 is coupled to an input terminal of the state machine circuit 308. A signal output by the comparator 306 is asserted, in at least some examples, when VIN/VOUT is greater than $R_{bk}$ and is de-asserted when VIN/VOUT is less than $R_{bk}$.

Figure 4:
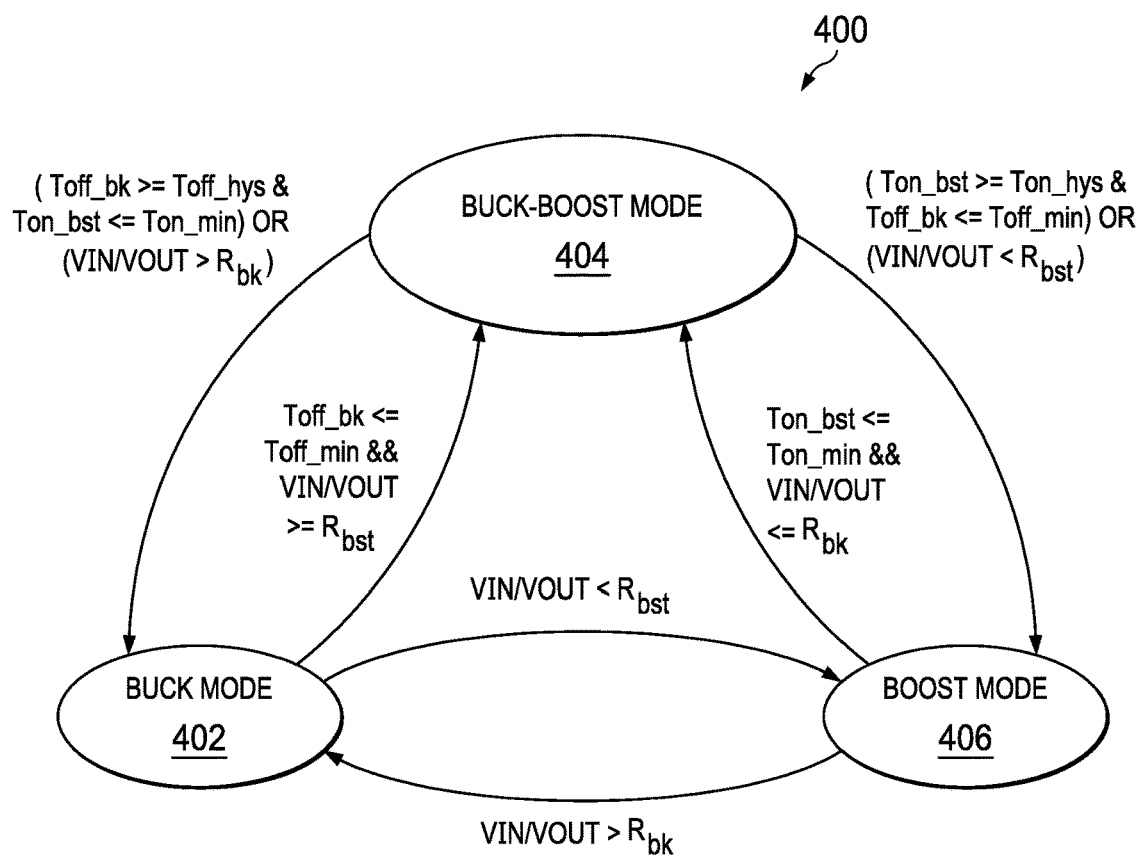
FIG. 4 shows an illustrative state diagram in accordance with various examples.

The state machine circuit 308, in at least some examples, receives a plurality of signals as discussed herein and implements a state machine to generate control signals for controlling the gate driver 128 to control the power converter 104. Turning for a moment to FIG. 4, an illustrative state diagram 400 is shown. In at least some examples, the state diagram 400 illustrates states and transition conditions for the state machine implemented by the state machine circuit 308 of the mode transition control circuit 126. Accordingly, reference may be made to components and/or signals of one or more other figures of the disclosure in describing the state diagram 400. Additionally, description of the state diagram 400 begins with the buck state 402, making an assumption that the power converter 104 is first controlled to operate in the buck mode of operation. However, when the power converter 104 is instead controlled to first operate in the boost mode of operation, a first state of the state diagram 400 that may be implemented may be the boost state 406.

At buck state 402, the state machine circuit 308 generates control signals for controlling the power converter 104 to operate in the buck mode of operation. While controlling the power converter 104 to operate in the buck mode of operation, the state machine circuit 308 monitors a plurality of received input signals to determine whether to transition to the buck-boost state 404 or the boost state 406. For example, when operating in the buck state 402 and the state machine circuit 308 determines based on the received input signals that VIN/VOUT is less than $R_{bst}$, the state machine circuit 308 transitions to the boost state 406. Similarly, when operating in the buck state 402 and the state machine circuit 308 determines based on the received input signals that Toff_bk is less than or equal to Toff_min and VIN/VOUT is greater than or equal to $R_{bst}$, the state machine circuit 308 transitions to the buck-boost state 404.

At buck-boost state 404, the state machine circuit 308 generates control signals for controlling the power converter 104 to operate in the buck-boost mode of operation. For example, the state machine circuit 308 generates control signals to cause the power converter 104 to alternatingly operate in the buck mode of operation and the boost mode of operation. For example, the control signals generated by the state machine circuit 308 cause the power converter 104 to execute a buck cycle of operation, followed by a boost cycle of operation, followed by another buck cycle of operation and continuing in this alternating manner for as long as the state machine circuit 308 operates at buck-boost state 404. While controlling the power converter 104 to operate in the buck-boost mode of operation, the state machine circuit 308 monitors the plurality of received input signals to determine whether to transition to the buck state 402 or the boost state 406. For example, when operating in the buck-boost state 404 and the state machine circuit 308 determines based on the received input signals that Toff_bk is greater than or equal to Toff_hys and Ton_bst is less than or equal to Ton_min, or that VIN/VOUT is greater than $R_{bk}$, the state machine circuit 308 transitions back to the buck state 402. Similarly, when operating in the buck-boost state 404 and the state machine circuit 308 determines based on the received input signals that Ton_bst is greater than or equal to Ton_hys and Toff_bk is less than or equal to Toff_min, or that VIN/VOUT is less than $R_{bst}$, the state machine circuit 308 transition to the boost state 406.

At boost state 406, the state machine circuit 308 generates control signals for controlling the power converter 104 to operate in the boost mode of operation. While controlling the power converter 104 to operate in the boost mode of operation, the state machine circuit 308 monitors the plurality of received input signals to determine whether to transition to the buck state 402 or the buck-boost state 404. For example, when operating in the boost state 406 and the state machine circuit 308 determines, based on the received input signals that VIN/VOUT is greater than $R_{bk}$, the state machine circuit 308 transitions back to the buck state 402. Similarly, when operating in the boost state 406 and the state machine circuit 308 determines based on the received input signals that Ton_bst is less than or equal to Ton_min and VIN/VOUT is less than $R_{bk}$, the state machine circuit 308 transitions back to the buck-boost state 404.

As illustrated by the state diagram 400, transitions to and from the buck-boost state 404 are controlled by time domain or voltage domain control. In this way, the state machine circuit 308 implements the dual hysteresis control scheme of the present disclosure to minimize an amount of time for which the state machine circuit 308 is operating in the buck-boost state 404. For example, by transitioning to the buck-boost state 404 only when both time domain and voltage domain requirements are met, and transitioning out of the buck-boost state 404 when either time domain or voltage domain requirements are met, the state machine circuit 308 minimizes an amount of time operating in the buck-boost state 404. In at least some examples, the control scheme implemented by the state machine circuit 308 is referred to as a dual hysteresis control scheme, as opposed to simply a dual control scheme. This reference results from the hysteresis factors, as discussed above, utilized in calculating at least some of the values relied on by the state machine circuit 308 preventing rapid oscillation between states.

Turning for a moment to FIG. 5, an illustrative graph 500 of buck-boost region width versus switching frequency is shown. In at least some examples, the graph 500 corresponds to a width of a buck-boost region of operation of the power converter 104 of the SMPS 100 under control of the controller 102, including the mode transition control circuit 126. The graph 500 illustrates a ratio of VOUT to VIN of the power converter 104, on the y-axis and switching frequency of the power converter 104 in units of MHz on the x-axis. As shown by the graph 500, when operating according to the dual hysteresis control scheme of the present disclosure, a width of the buck boost region of operation of the power converter 104 is reduced when compared to a singular control scheme. For example, as shown by the graph 500, at a switching frequency of approximately 200 kHZ (e.g., 0.2 MHz), the buck boost region of operation of the power converter 104 has a width of about 0.06. As is illustrated in the graph 500, this width of 0.06 is less than the approximately 0.2 width of the buck boost region of operation at the same switching frequency and operating only according to time domain hysteresis. Similarly, at a switching frequency of about 2 MHz, the buck boost region of operation of the power converter has a width of about 0.58.

Figure 6:
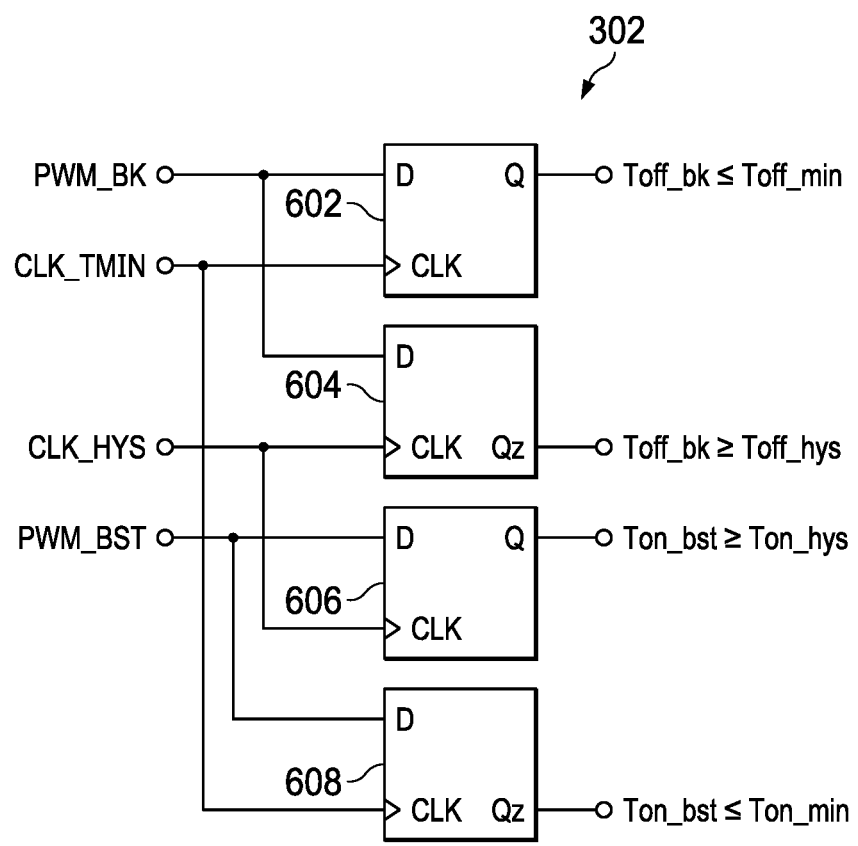
FIG. 6 shows a schematic diagram of an illustrative timing detection circuit in accordance with various examples.

Returning now to FIG. 3, as discussed above, the timing detection circuit 302 makes a plurality of timing determinations and outputs a plurality of signals to the state machine circuit 308 indicating a result of a respective one of the timing determinations. Turning now to FIG. 6 a schematic diagram of an illustrative implementation of the timing detection circuit 302 is shown. Accordingly, the timing detection circuit 302 as shown in FIG. 3 is suitable for implementation in at least some examples of the mode transition control circuit 126 of FIG. 3. Therefore, reference may be made in describing FIG. 6 to at least some components and/or signals introduced and/or described above with respect to other figures of the present disclosure.

In at least one implementation, the timing detection circuit 302 includes a d flip-flop 602, a d flip-flop 604, a d flip-flop 606, and a d flip-flop 608. The d flip-flop 602, in at least some examples, is configured to receive PWM_BK at a data input terminal (indicated in FIG. 6 as D). The d flip-flop 602 is further configured to receive CLK_TMIN at a clock input terminal (indicated in FIG. 6 as CLK). The d flip-flop 602 outputs Toff_bk<=Toff_min at an output terminal (indicated in FIG. 6 as Q). In at least some examples, the data input terminal is coupled to the output terminal of the comparator 122 of FIG. 1, the clock input terminal is coupled to the timing generator 114, and the output terminal is coupled to the state machine circuit 308 of FIG. 3.

The d flip-flop 604, in at least some examples, is configured to receive PWM_BK at a data input terminal. The d flip-flop 604 is further configured to receive CLK_HYS at a clock input terminal. The d flip-flop 604 outputs Toff_bk>=Toff_hys at an inverse output terminal (indicated in FIG. 6 as Qz). In at least some examples, the data input terminal is coupled to the output terminal of the comparator 122 of FIG. 1, the clock input terminal is coupled to the oscillator 116, and the output terminal is coupled to the state machine circuit 308 of FIG. 3.

The d flip-flop 606, in at least some examples, is configured to receive PWM_BST at a data input terminal. The d flip-flop 606 is further configured to receive CLK_HYS at a clock input terminal. The d flip-flop 606 outputs Ton_bst>=Ton_hys at an output terminal. In at least some examples, the data input terminal is coupled to the output terminal of the comparator 124 of FIG. 1, the clock input terminal is coupled to the oscillator 116, and the output terminal is coupled to the state machine circuit 308 of FIG. 3.

The d flip-flop 608, in at least some examples, is configured to receive PWM_BST at a data input terminal. The d flip-flop 608 is further configured to receive CLK_TMIN at a clock input terminal. The d flip-flop 608 outputs Ton_bst<=Ton_min at an inverse output terminal. In at least some examples, the data input terminal is coupled to the output terminal of the comparator 124 of FIG. 1, the clock input terminal is coupled to the timing generator 114, and the output terminal is coupled to the state machine circuit 308 of FIG. 3.

Based on values of PWM_BK, PWM_BST, CLK_TMIN, and CLK_HYS, the timing detection circuit 302 generates and outputs Toff bk<=Toff_min, Toff_bk>=Toff_hys, Ton_bst>=Ton_hys, and Ton_bst<=Ton_min. For example, turning now to FIGS. 7-10, various illustrative timing diagrams demonstrating operation of the timing detection circuit 302 are shown. As shown in FIGS. 7-10, a duration of time between a rising edge of CLK_TMIN and a rising edge of PWM_BK is Toff min. Similarly, a duration of time between a rising edge of CLK_TMIN and a falling edge of PWM_BST is Ton_min. A duration of time between a rising edge of CLK_HYS and a rising edge of PWM_BK is Toff_hys and a duration time between a rising edge of CLK_HYS and a falling edge of PWM_BST is Ton_hys.

Figure 7:
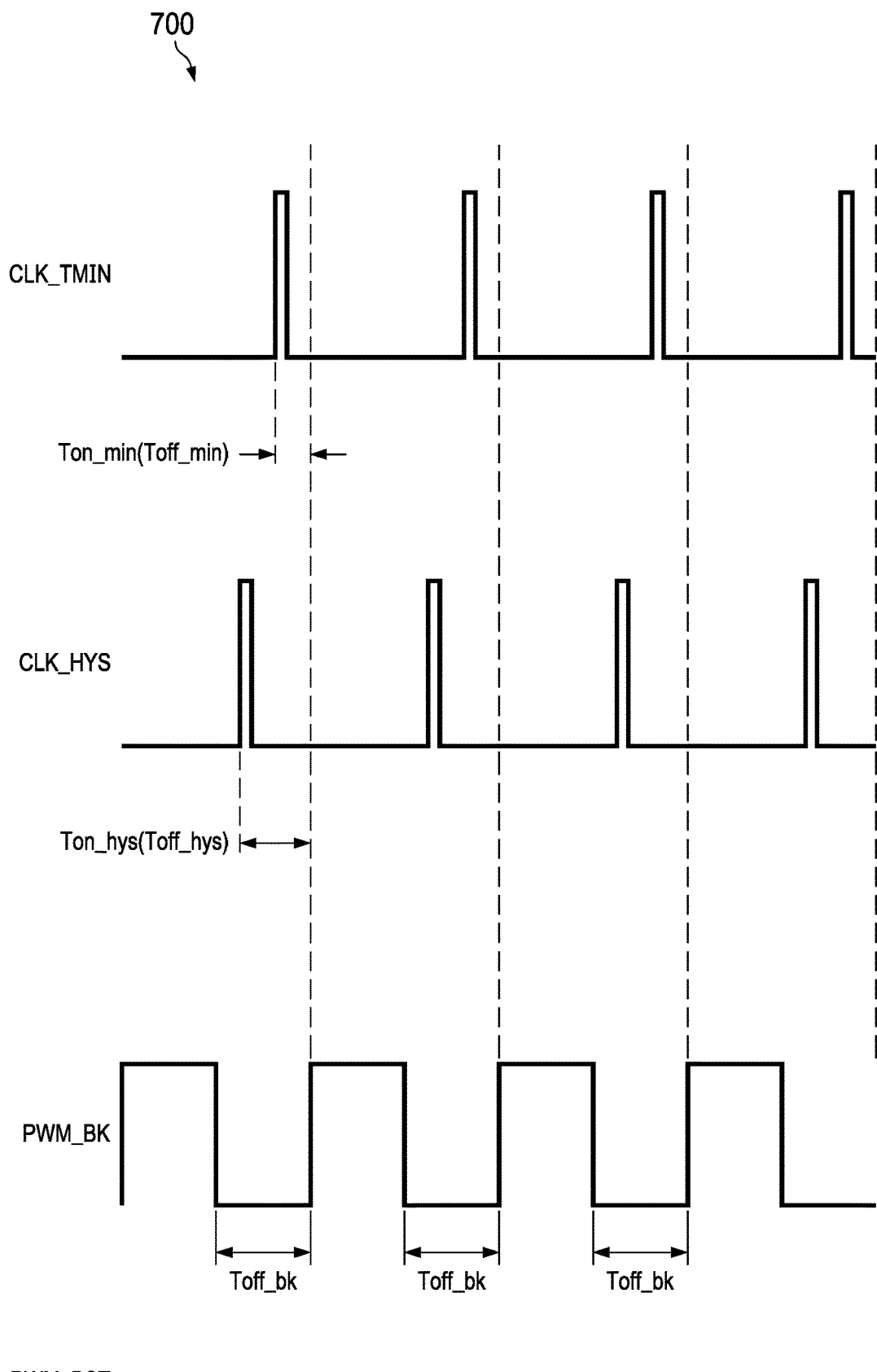
FIG. 7 shows an illustrative timing diagram in accordance with various examples.

For example, the timing diagram 700 of FIG. 7 illustrates generation of a control signal indicating that Toff bk is greater than Toff hys. As discussed above, the timing detection circuit 302 receives PWM_BK, PWM_BST, CLK_TMIN, and CLK_HYS. Based on a value of PWM_BK at a rising edge of CLK_HYS, the timing detection circuit 302 generates an output signal Toff_bk>Toff_hys. For example, when PWM_BK is de-asserted (e.g., in at least one example, has a logical low value) at a rising edge of CLK_HYS, the timing detection circuit 302 asserts Toff_bk>Toff_hys. In at least some examples, Toff_bk>=Toff_hys remains asserted until a next rising edge of PWM_BK.

Figure 8:
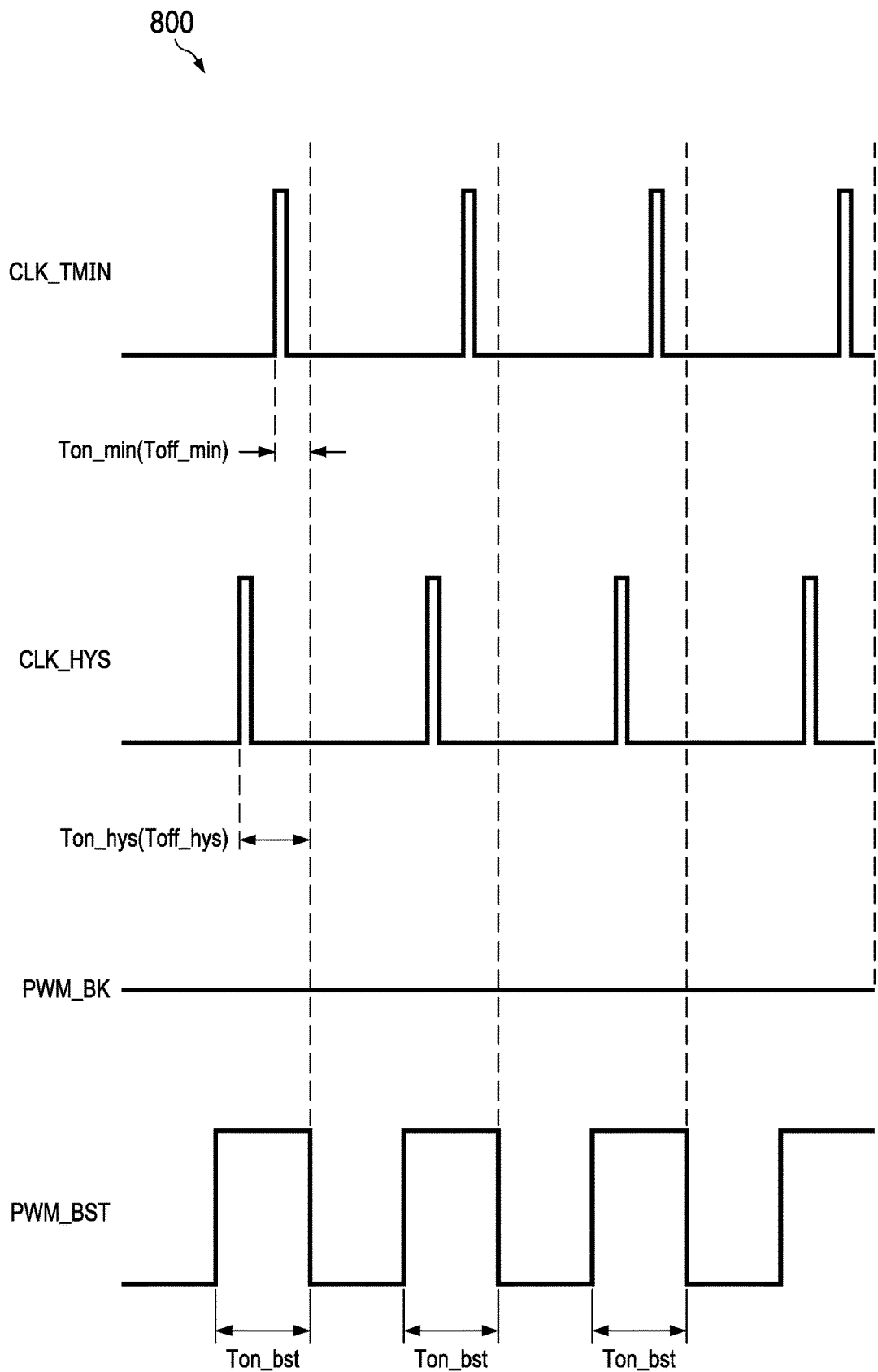
FIG. 8 shows an illustrative timing diagram in accordance with various examples.

The timing diagram 800 of FIG. 8 illustrates generation of a control signal indicating that Ton_bst is greater than Ton_hys. As discussed above, the timing detection circuit 302 receives PWM_BK, PWM_BST, CLK_TMIN, and CLK_HYS. Based on a value of PWM_BST at a rising edge of CLK_HYS, the timing detection circuit 302 generates an output signal Ton_bst>Ton_hys. For example, when PWM_BST is asserted (e.g., in at least one example, has a logical high value) at a rising edge of CLK_HYS, the timing detection circuit 302 asserts Ton_bst>Ton_hys. In at least some examples, Ton_bst>=Ton_hys remains asserted until a next rising edge of PWM_BST.

Figure 9:
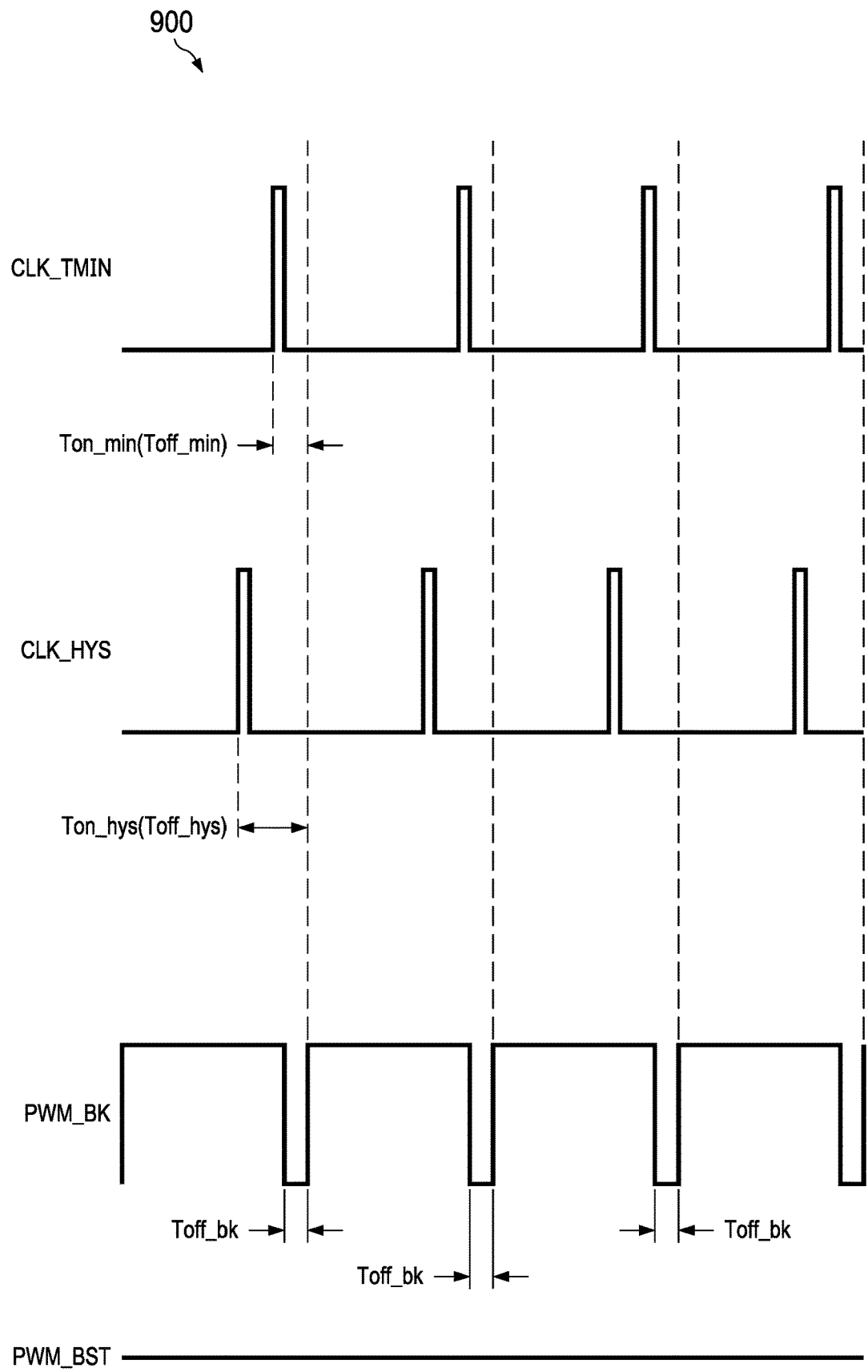
FIG. 9 shows an illustrative timing diagram in accordance with various examples.

The timing diagram 900 of FIG. 9 illustrates generation of a control signal indicating that Toff_bk is less than or equal to Toff min. As discussed above, the timing detection circuit 302 receives PWM_BK, PWM_BST, CLK_TMIN, and CLK_HYS. Based on a value of PWM_BK at a rising edge of CLK_TMIN, the timing detection circuit 302 generates an output signal Toff_bk<=Toff_min. For example, when PWM_BK is asserted (e.g., in at least one example, has a logical high value) at a rising edge of CLK_TMIN, the timing detection circuit 302 asserts Toff_bk<=Toff_min. In at least some examples, Toff_bk<=Toff_min remains asserted until a next rising edge of PWM_BK.

Figure 10:
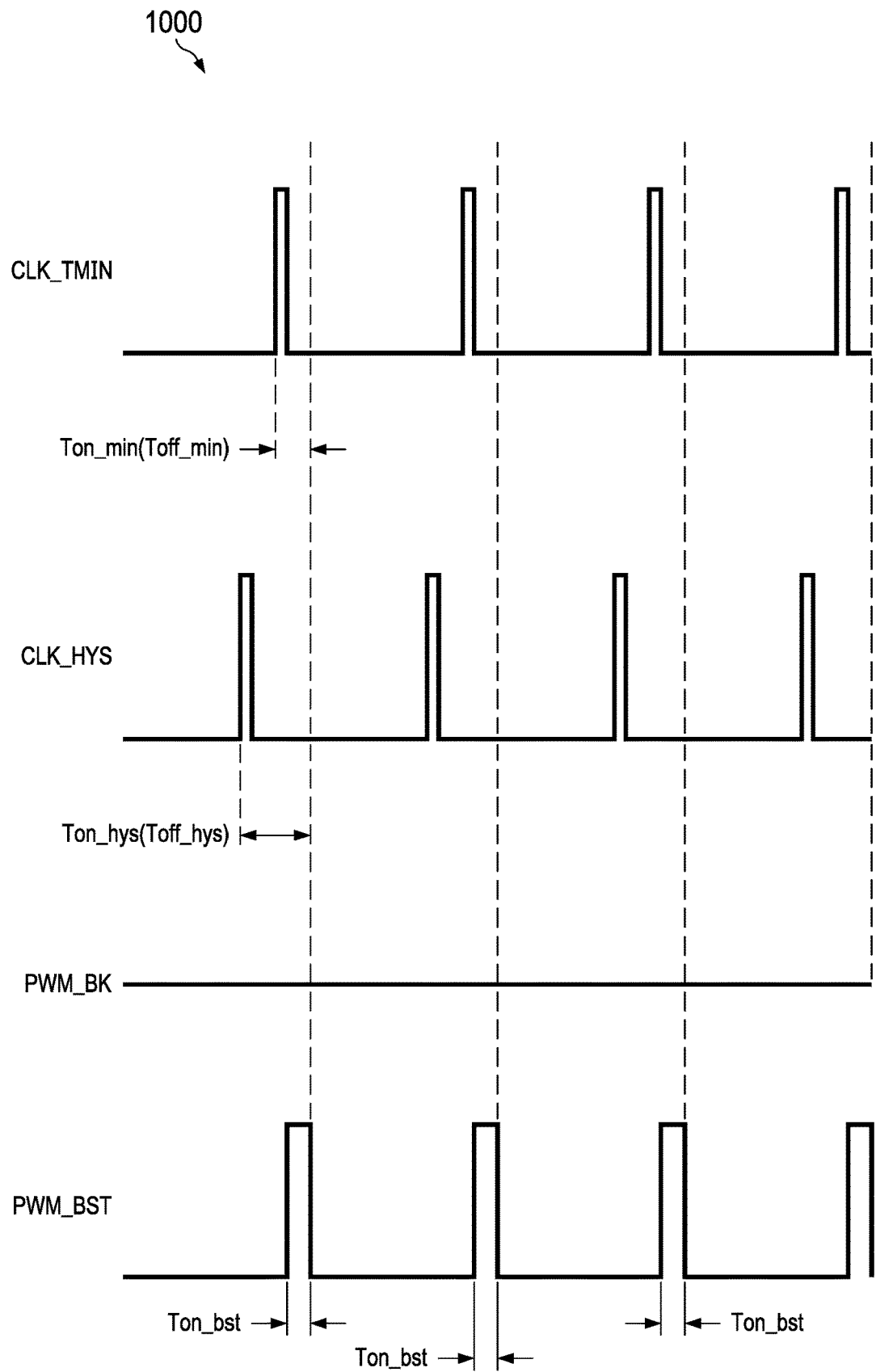
FIG. 10 shows an illustrative timing diagram in accordance with various examples.

The timing diagram 1000 of FIG. 10 illustrates generation of a control signal indicating that Ton_bst is less than or equal to Ton_min. As discussed above, the timing detection circuit 302 receives PWM_BK, PWM_BST, CLK_TMIN, and CLK_HYS. Based on a value of PWM_BST at a rising edge of CLK_TMIN, the timing detection circuit 302 generates an output signal Ton_bst<=Ton_min. For example, when PWM_BST is de-asserted (e.g., in at least one example, has a logical low value) at a rising edge of CLK_TMIN, the timing detection circuit 302 asserts Ton_bst<=Ton_min. In at least some examples, Ton_bst<=Ton_min remains asserted until a next rising edge of PWM_BST.

Figure 11:
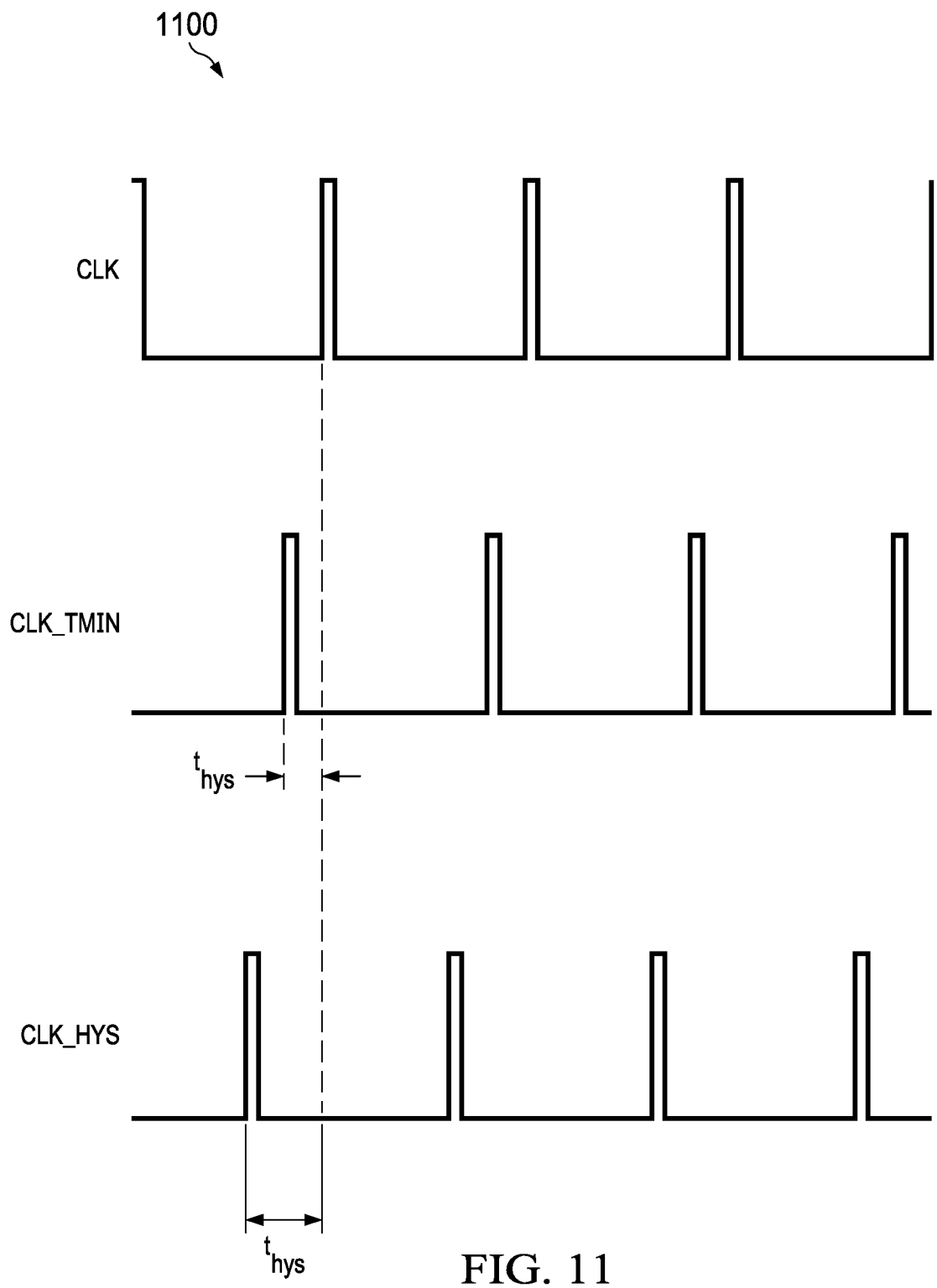
FIG. 11 shows an illustrative timing diagram in accordance with various examples.

Turning now to FIG. 11, an illustrative timing diagram 1100 is shown. In at least some examples, the timing diagram 1100 illustrates at least some signals of the SMPS 100 of FIG. 1, discussed above. Therefore, reference may be made in describing FIG. 11 to at least some components and/or signals introduced and/or described above with respect to FIG. 1. The timing diagram 1100 illustrates CLK_HYS, as generated and output by the oscillator 116. As discussed above, the timing generator 114 generates CLK and CLK_TMIN by delaying or otherwise manipulating CLK_HYS. For example, as shown by the timing diagram 1100, the timing generator 114 manipulates CLK_HYS to generate CLK having a rising edge delayed by $t_{hys}$ from a rising edge of CLK_HYS. As further shown by the timing diagram 1100, the timing generator 114 manipulates CLK_HYS to generate CLK_TMIN having a rising edge delayed by $t_{hys}$ minus $t_{min}$ from a rising edge of CLK_HYS. In this way, the rising edge of CLK_TMIN precedes a rising edge of CLK by $t_{min}$.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, MOSFET, n-type, p-type, etc.), these components may be exchanged for components of other process technologies (e.g., replace FET and/or MOSFET with BJT, replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
    a voltage measurement circuit having first inputs and a first output, the first inputs adapted to be coupled to a power converter, the voltage measurement circuit configured to:
        receive, via the first inputs, an input voltage of the power converter and an output voltage of the power converter; and
        provide, via the first output, a first control signal based on the input voltage and the output voltage;
    a timing circuit having second inputs and second outputs, the timing circuit configured to:
        receive, via the second inputs, timing signals indicative of an on-time of a boost mode of operation of the power converter and an off-time of a buck mode of operation of the power converter;
        generate a second control signal based on a relationship between the on-time of the boost mode and an on-time threshold;
        generate a third control signal based on a relationship between the off-time of the buck mode and an off-time threshold; and
        provide, via the second outputs, the second control signal based and the third control signal; and
    a mode control circuit having third inputs and third outputs, the third inputs coupled to the first output and the second outputs, the third outputs adapted to be coupled to the power converter, the mode control circuit configured to:
        in the buck mode, provide buck mode signals via the third outputs;
        in the boost mode, provide boost mode signals via the third outputs;
        in a buck-boost mode, provide buck-boost mode signals via the third outputs;
        receive, via the third inputs, the first control signal, the second control signal, and the third control signal; and
        transition between the buck-boost mode and the buck mode, and between the buck-boost mode and the boost mode, based on at least one of the first control signal, the second control signal, or the third control signal.

2. The circuit of claim 1, wherein the mode control circuit is configured to:
    transition from the buck mode to the boost mode based on the first control signal indicating that a ratio between the input voltage and the output voltage is less than a first ratio threshold; and
    transition from the buck mode to the buck-boost mode based on: (a) the third control signal indicating that the off-time of the buck mode of operation is less than or equal to the off-time threshold; and (b) the first control signal indicating that the ratio between the input voltage and the output voltage is greater than or equal to a second ratio threshold.

3. The circuit of claim 2, wherein the off-time threshold is a first off-time threshold; and
    wherein the mode control circuit is configured to transition from the buck-boost mode to the buck mode based on at least one of:
        the second control signal and the third control signal indicating, respectively, that the on-time of the boost mode is less than or equal to the on-time threshold and that the off-time of the buck mode is greater than or equal to a second off-time threshold;
    or
        the first control signal indicating that the ratio between the input voltage and the output voltage is greater than a third ratio threshold.

4. The circuit of claim 1, wherein the mode control circuit is configured to:
    transition from the boost mode to the buck mode based on the first control signal indicating that a ratio between the input voltage and the output voltage is greater than a first ratio threshold; and
    transition from the boost mode to the buck-boost mode based on: (a) the second control signal indicating that the on-time of the boost mode of operation is less than or equal to the on-time threshold; and (b) the first control signal indicating that the ratio between the input voltage and the output voltage is less than or equal to a second ratio threshold.

5. The circuit of claim 4, wherein the on-time threshold is a first on-time threshold; and
    wherein the mode control circuit is configured to transition from the buck-boost mode to the boost mode based on at least one of:

the second control signal and the third control signal indicating, respectively, that the on-time of the boost mode is greater than or equal to a second on-time threshold and that the off-time of the buck mode is less than or equal to the off-time threshold; or the first control signal indicating that the ratio between the input voltage and the output voltage is less than a third ratio threshold.

6. The circuit of claim 1, wherein the mode control circuit is configured to:
   for the power converter to operate below a first frequency, transition between the buck-boost mode and the buck mode, or between the buck-boost mode and the boost mode, based on the second control signal and the third control signal; and
   for the power converter to operate above a second frequency, transition between the buck-boost mode and the buck mode, or between the buck-boost mode and the boost mode, based on the first control signal;
   in which the second frequency is higher than the first frequency.

7. The circuit of claim 6, wherein the first frequency equals 500 kilohertz; and
   wherein the second frequency equals 1.8 megahertz.

8. The circuit of claim 1, wherein the timing signals include:
   a first clock signal;
   a second clock signal;
   a third timing signal based on a first duty cycle of the power converter in the boost mode; and
   a fourth timing signal based on a second duty cycle of the power converter in the buck mode;
   wherein the on-time threshold is a first on-time threshold;
   wherein the off-time threshold is a first off-time threshold; and
   wherein the timing circuit is configured to:
      determine, based on the first clock signal, the second clock signal, and the third timing signal: (a) a first relationship between the on-time of the boost mode and the first on-time threshold; and (b) a second relationship between the on-time of the boost mode and a second on-time threshold;
      determine, based on the first clock signal, the second clock signal, and the fourth timing signal: (a) a third relationship between the off-time of the buck mode and the first off-time threshold; and (b) a fourth relationship between the off-time of the buck mode and a second off-time threshold;
      generate the second control signal based on at least one of the first relationship or the second relationship; and
      generate the third control signal based on at least one of the third relationship or the fourth relationship.

9. The circuit of claim 1, wherein the voltage measurement circuit includes a comparator having a comparator output and first and second comparator inputs, the comparator output is coupled to the third inputs, and the comparator is configured to provide an indication signal at the comparator output responsive to:
   a first voltage at the first comparator input, in which the first voltage represents the output voltage multiplied by a ratio threshold of the boost mode; and
   a second voltage at the second comparator input, in which the second voltage represents the input voltage;
   in which the indication signal indicates whether a ratio between the input voltage and the output voltage is less than the ratio threshold.

10. The circuit of claim 1, wherein the voltage measurement circuit includes a comparator having a comparator output and first and second comparator inputs, the comparator output is coupled to the third inputs, and the comparator is configured to provide an indication signal at the comparator output responsive to:
    a first voltage at the first comparator input, in which the first voltage represents the input voltage divided by a ratio threshold of the buck mode; and
    a second voltage at the second comparator input, in which the second voltage represents the output voltage;
    in which the indication signal indicates whether a ratio between the input voltage and the output voltage is greater than the ratio threshold.

11. A circuit, comprising:
    a timing circuit having first inputs and first outputs, the first inputs adapted to be coupled to a power converter, the timing circuit configured to:
       receive, via the first inputs, timing signals indicative of an on-time of a boost mode of operation of the power converter and an off-time of a buck mode of operation of the power converter;
       generate a first control signal based on a relationship between the on-time of the boost mode and an on-time threshold;
       generate a second control signal based on a relationship between the off-time of the buck mode and an off-time threshold; and
       provide, via the first outputs, the first control signal and the second control signal; and
    a control circuit having second inputs and second outputs, the second inputs coupled to the first outputs, the second outputs adapted to be coupled to the power converter, the control circuit configured to:
       in a first mode, provide buck mode signals or boost mode signals via the second outputs;
       in a buck-boost mode, provide buck-boost mode signals via the second outputs;
       receive, via the second inputs, the first and second control signals; and
       transition between the first mode and the buck-boost mode based on at least one of the first control signal or the second control signal.

12. The circuit of claim 11, further comprising a voltage measurement circuit, the voltage measurement circuit having third inputs and third outputs, the third inputs adapted to be coupled to the power converter, the third outputs coupled to the second inputs, the voltage measurement circuit configured to:
    receive, via the third inputs, an input voltage and an output voltage of the power converter; and
    provide, via the third outputs, a third control signal based on the input voltage and the output voltage;
    wherein the first mode is a buck mode; and
    wherein the control circuit is configured to:
       receive, via the second inputs, the third control signal; and
       transition from the buck-boost mode to the buck mode based on at least one of: the second control signal and the first control signal indicating, respectively, that the off-time of the buck mode is greater than or equal to the off-time threshold and that the on-time of the boost mode is less than or equal to the on-time threshold; or the third control signal indicating that a ratio between the input voltage and the output voltage is greater than a ratio threshold.

13. The circuit of claim 12, wherein:
the off-time threshold is a first off-time threshold;
the on-time threshold is a first on-time threshold;
the ratio threshold is a first ratio threshold; and
the control circuit is configured to transition from the buck-boost mode to a boost mode based on at least one of:
the first control signal and the second control signal indicating, respectively, that the on-time of the boost mode is greater than or equal to a second on-time threshold and that the off-time of the buck mode is less than or equal to a second off-time threshold; or
the third control signal indicating that that the ratio between the input voltage and the output voltage is less than a second ratio threshold.

14. The circuit of claim 12, wherein the control circuit is configured to:
for the power converter to operate below a first frequency, transition from the buck-boost mode to a buck mode or to a boost mode based on the first and second control signals; and
for the power converter to operate above a second frequency, transition from the buck-boost mode to the buck mode or to the boost mode based on the third control signal;
in which the second frequency is higher than the first frequency.

15. A system, comprising:
a power converter coupled to a load and configured to provide the load with an output voltage switched from an input voltage by the power converter; and
a controller coupled to the power converter, the controller including:
a timing circuit having first inputs and first outputs, the first inputs coupled to the power converter, the timing circuit configured to:
receive, via the first inputs, timing signals indicative of an on-time of a boost mode of operation of the power converter and an off-time of a buck mode of operation of the power converter;
generate a first control signal based on a relationship between the on-time of the boost mode and an on-time threshold;
generate a second control signal based on a relationship between the off-time of the buck mode and an off-time threshold; and
provide, via the first outputs, the first control signal and the second control signal; and
a mode control circuit having second inputs and second outputs, the second inputs coupled to the first outputs of the timing circuit, the second outputs coupled to the power converter, the mode control circuit configured to:
in a first mode, provide buck mode signals or boost mode signals via the second outputs;
in a buck-boost mode, provide buck-boost mode signals via the second outputs;
receive, via the second inputs, the first and second control signals; and
transition between the first mode and the buck-boost mode based on at least one of the first control signal or the second control signal.

16. The system of claim 15, wherein the on-time threshold is a first on-time threshold, the off-time threshold is a first off-time threshold, and the timing circuit is configured to:
receive timing signals including a first clock signal, a second clock signal, a third timing signal, and a fourth timing signal, in which the third timing signal is based on a first duty cycle of the power converter in the boost mode and the fourth timing signal is based on a second duty cycle of the power converter in the buck mode;
determine, based on the first clock signal, the second clock signal, and the third timing signal: (a) a first relationship between the on-time of the boost mode and thea first on-time threshold; and (b) a second relationship between the on-time of the boost mode and a second on-time threshold;
determine, based on the first clock signal, the second clock signal, and the fourth timing signal: (a) a third relationship between the off-time of the buck mode and the first off-time threshold; and (b) a fourth relationship between the off-time of the buck mode and a second off-time threshold;
generate the first control signal based on at least one of the first relationship or the second relationship; and
generate the second control signal based on at least one of the third relationship or the fourth relationship.

17. The system of claim 15, wherein the controller further includes a voltage measurement circuit, the voltage measurement circuit having third inputs and third outputs, the third inputs coupled to the power converter, the third outputs coupled to the second inputs, the voltage measurement circuit configured to:
receive, via the third inputs, the input voltage and the output voltage of the power converter; and
provide, via the third outputs, a third control signal based on the input voltage and the output voltage; and
wherein the mode control circuit is configured to:
transition from the first mode to the buck-boost mode based on the third control signal and one of the first control signal or the second control signal; and
transition from the buck-boost mode to the first mode based on at least one of the first control signal, the second control signal, or the third control signal.

18. The system of claim 17, wherein:
the first mode is a buck mode; and
the mode control circuit is configured to:
transition from the buck mode to the buck-boost mode based on: (a) the second control signal indicating that the off-time of the buck mode is less than or equal to the off-time threshold; and (b) the third control signal indicating that a ratio between the input voltage and the output voltage is greater than or equal to a first ratio threshold; and
transition from a boost mode to the buck-boost mode based on: (a) the first control signal indicating that the on-time of the boost mode is less than or equal to the on-time threshold; and (b) the third control signal indicating that the ratio between the input voltage and the output voltage is less than or equal to a second ratio threshold.

19. The system of claim 18, wherein:
the off-time threshold is a first off-time threshold;
the on-time threshold is a first on-time threshold; and
the mode control circuit is configured to:
transition from the buck-boost mode to the buck mode based on at least one of:
the second control signal and the first control signal indicating, respectively, that the off-time of the buck mode is greater than or equal to a second off-time threshold and that the on-time of the boost mode of is less than or equal to a second on-time threshold; or the third control signal indicating that the ratio between the input voltage and the output voltage is greater than a third ratio threshold; and
transition from the buck-boost mode to the boost mode based on at least one of:
the first control signal and the second control signal indicating, respectively, that the on-time of the boost mode is greater than or equal to a third on-time threshold and that the off-time of the buck mode of operation is less than or equal to a third off-time threshold, or
the third control signal indicating that the ratio between the input voltage and the output voltage is less than a fourth ratio threshold.

20. The system of claim 17, wherein the mode control circuit is configured to:
for the power converter to operate below a first frequency, transition from the buck-boost mode to a buck mode or to a boost mode based on the first and second control signals; and
for the power converter to operate above a second frequency, transition from the buck-boost mode to the buck mode or to the boost mode based on the third control signal;
in which the second frequency is higher than the first frequency.

21. The circuit of claim 3, wherein:
at least one of the first ratio threshold or the second ratio threshold is based on a maximum ratio between the input voltage and the output voltage for the boost mode;
the third ratio threshold is based on a minimum ratio between the input voltage and the output voltage for the buck mode;
at least one of the first off-time threshold or the second off-time threshold is based on a minimum off-time of the buck mode; and
the on-time threshold is based on a minimum on-time of the boost mode.

22. The circuit of claim 5, wherein:
at least one of the first ratio threshold or the second ratio threshold is based on a minimum ratio between the input voltage and the output voltage for the buck mode;
the third ratio threshold is based on a maximum ratio between the input voltage and the output voltage for the boost mode;
at least one of the first on-time threshold or the second on-time threshold is based on a minimum on-time of the boost mode; and
the off-time threshold is based on a minimum off-time of the buck mode.

23. The circuit of claim 1, wherein the buck-boost mode signals are configured to cause the power converter to operate in alternating cycles of the buck mode and the boost mode.

24. The circuit of claim 13, wherein:
at least one of the first off-time threshold or the second off-time threshold is based on a minimum off-time of the buck mode of operation;
at least one of the first on-time threshold or the second on-time threshold is based on a minimum on-time of the boost mode of operation;
the first ratio threshold is based on a minimum ratio between the input voltage and the output voltage for the buck mode of operation; and the second ratio threshold is based on maximum ratio between the input voltage and the output voltage for the boost mode of operation.

25. The system of claim 19, wherein:
at least one of the first off-time threshold, the second off-time threshold, or the third off-time threshold is based on a minimum off-time of the buck mode of operation;
at least one the first on-time threshold, the second on-time threshold, or the third on-time threshold is based on a minimum on-time of the boost mode of operation;
at least one of the first ratio threshold or the fourth ratio threshold is based on a maximum ratio between the input voltage and the output voltage for the boost mode of operation; and
at least one of the second ratio threshold or the third ratio threshold is based on a minimum ratio between the input voltage and the output voltage for the buck mode of operation.

26. A circuit comprising:
a voltage measurement circuit having first inputs and first outputs, the first inputs adapted to be coupled to a power converter, the voltage measurement circuit configured to:
receive, via the first inputs, an input voltage of the power converter and an output voltage of the power converter; and
provide, via the first outputs, a first control signal based on the input voltage and the output voltage;
a timing circuit having second inputs and second outputs, the second inputs adapted to be coupled to the power converter, the timing circuit configured to:
receive, via the second inputs, timing signals indicative of a first timing of a boost mode of operation of the power converter and a second timing of a buck mode of operation of the power converter;
generate a second control signal based on a relationship between the first timing and a first timing threshold;
generate a third control signal based on a relationship between the second timing and a second timing threshold; and
provide, via the second outputs, the second control signal and the third control signal; and
a mode control circuit having third inputs and third outputs, the third inputs coupled to the first outputs of the voltage measurement circuit and the second outputs of the timing circuit, the third outputs adapted to be coupled to the power converter, the mode control circuit configured to:
in a first mode, provide buck mode signals or boost mode signals via the third outputs;
in a buck-boost mode, provide buck-boost mode signals via the third outputs;
receive the first control signal, the second control signal, and the third control signal via the third inputs; and
transition between the buck-boost mode and the first mode based on at least one of first control signal, the second control signal, or the third control signal.

27. The circuit of claim 26, wherein the mode control circuit is configured to:
transition from the first mode to the buck-boost mode based on the first control signal and one of the second control signal or the third control signal; and transition from the buck-boost mode to the first mode based on at least one of: (a) the first control signal; or (b) the second control signal and the third control signal.

28. The circuit of claim 26, wherein the first mode is a buck mode; and
wherein the mode control circuit is configured to transition between the buck mode and a boost mode based on the first control signal.

* * * * *